United States Patent
Berkowitz et al.

(10) Patent No.: US 7,474,746 B2
(45) Date of Patent: Jan. 6, 2009

(54) MULTI-USER TELEPHONE SYSTEM

(75) Inventors: Judah S. Berkowitz, Chester Springs, PA (US); Edward J. Sager, Kimberton, PA (US)

(73) Assignee: Atris, Incorporated, Oaks, PA (US)

( * ) Notice: Subject to any disclaimer, the term of this patent is extended or adjusted under 35 U.S.C. 154(b) by 1195 days.

(21) Appl. No.: 10/822,127

(22) Filed: Apr. 9, 2004

(65) Prior Publication Data
US 2005/0226218 A1 Oct. 13, 2005

(51) Int. Cl.
*H04M 7/00* (2006.01)
(52) U.S. Cl. ........................... 379/225; 370/352
(58) Field of Classification Search ................ 370/328, 370/352; 379/225, 219; 709/229
See application file for complete search history.

(56) References Cited

U.S. PATENT DOCUMENTS 6,236,716 B1 * 5/2001 Marcus et al. ............ 379/88.15
6,999,431 B2 * 2/2006 Rines ......................... 370/328
7,376,124 B2 * 5/2008 Lee et al. ................... 370/352
2003/0041152 A1 * 2/2003 Schmeltzle et al. ........ 709/229
2003/0235182 A1 * 12/2003 McMullin .................. 370/352
2004/0160951 A1 * 8/2004 Galvin et al. .............. 370/352

\* cited by examiner

*Primary Examiner*—Olisa Anwah
(74) *Attorney, Agent, or Firm*—Andrew L. Ney

(57) ABSTRACT

A multi-user telephone system composed of a plurality of user networks installed at the same general location. Each user network has a different telephone number and a plurality of VOIP extensions each having a different extension number. A server, upon confirming the address of an outgoing VOIP signal as an address of an intended recipient of the outgoing VOIP signal, permits the outgoing VOIP to be conducted to the internet. The VOIP extensions also can develop outgoing PSTN signals for transmission via a public switched telephone network. The server, upon detecting a PSTN outgoing signal, permits the outgoing PSTN signal to be conducted to a public switched telephone network. The server also confirms that the address of an incoming signal, from the internet or from a public switched telephone network, is an address of an extension in one of the user networks.

20 Claims, 3 Drawing Sheets

MULTI-USER TELEPHONE SYSTEM

FIELD OF THE INVENTION

The present invention relates, in general, to telephone communications and, in particular, to a multi-user telephone system composed of a plurality of user networks installed at the same general location with each network having a different telephone number and a plurality of extensions.

BACKGROUND OF THE INVENTION

Telephone system installations in multi-occupant facilities, where each occupant of the facility has a different telephone number and a plurality of extensions, in the past have been arranged either: (a) as separate user systems set up by the occupants individually and separately connected to a public switched telephone network (PSTN) through a local telephone switch or router each dedicated to the individual user telephone system, or (b) as multi-exchange shared systems set up by, for example, the landlords of the facilities, with each individual user telephone exchange system in the overall shared system connected to a public switched is telephone network though a private branch exchange (PBX) used in common by the plurality of occupants of the facility, or (c) as separate user systems set up by the occupants individually and separately connected directly to a public switched telephone network.

Such prior art telephone installations in multi-occupant facilities suffer from one or more of the following shortcomings. One shortcoming is the expenses associated with the individual installation and maintenance of telephone systems installed and maintained by the users. Another is the high cost of the private branch exchange that is included in a shared multi-exchange system. A shortcoming common to both prior art arrangements is the large number of cable pairs that is required for conventional telephone voice transmissions. Yet another shortcoming of many such prior art multi-user telephone installations is that only voice transmission and reception are provided, so that another communications system, capable of transmitting and receiving data, is needed for those users that transmit and receive data. Still another shortcoming of many such prior art multi-user telephone installations is that they transmit and receive voice transmissions by conventional telephonic means at higher costs than voice transmissions by voice over Internet protocol (VOIP).

SUMMARY OF THE INVENTION

A multi-user telephone system, constructed in accordance with the present Invention, includes a plurality of user telephone networks, all in the same general location, with each user telephone network having a plurality of VOIP telephone extensions. All of the VOIP telephone extensions in the same user telephone network have the same telephone number and each VOIP telephone extension has an extension number different from the extension numbers of the other VOIP telephone extensions of same user telephone network. Each VOIP telephone extension develops outgoing VOIP signals for transmission via the internet. Each such outgoing VOIP signal has an audio component digitized from audio frequency signals developed by the VOIP telephone extension and an address component corresponding to the address of the intended recipient of the outgoing VOIP signal. Each VOIP telephone extension also converts incoming VOIP signals received from the internet to audio signals that are broadcast by the VOIP telephone extension. Each user telephone network also includes a user network switch to which each VOIP telephone extension of that user telephone network is connected and through which the outgoing VOIP signals developed by the VOIP telephone extensions of the user telephone network are conducted from the VOIP telephone extensions. The user network switches also conduct incoming VOIP signals received from the internet to the VOIP telephone extensions. A multi-user telephone system, constructed in accordance with the present invention, also includes a facility network switch to which the user network switches of the user networks are connected and through which the outgoing VOIP signals are conducted from the user network switches and the incoming VOIP signals received from the internet are conducted to the user network switches. A multi-user telephone system, constructed in accordance with the present invention, further includes an internet gateway connected to the facility network switch and adapted for connection to the internet. The outgoing VOIP signals developed by the VOIP telephone extensions are conducted to the internet through the internet gateway and incoming VOIP signals received from the internet are conducted through the internet gateway to the facility network switch. A multi-user telephone system, constructed in accordance with the present invention, also includes a server programmed with the addresses of intended recipients of the outgoing VOIP signals and the addresses of the VOIP telephone extensions in the user telephone networks. The server confirms the addresses of the intended recipients of the outgoing VOIP signals as being addresses programmed in the server and controls the facility network switch to conduct the outgoing VOIP signals to the internet gateway upon confirming the addresses of the intended recipients of the outgoing VOIP signals as being addresses programmed in the server. The server also confirms the addresses of the incoming VOIP signals as being addresses programmed in the server and, upon confirming the addresses of the incoming VOIP signals as being addresses programmed in the server, controls the facility network switch to conduct the incoming VOIP signals to the appropriate user network switch for passage to the appropriate VOIP telephone extensions.

DETAILED DESCRIPTION OF THE INVENTION

Figure 1:
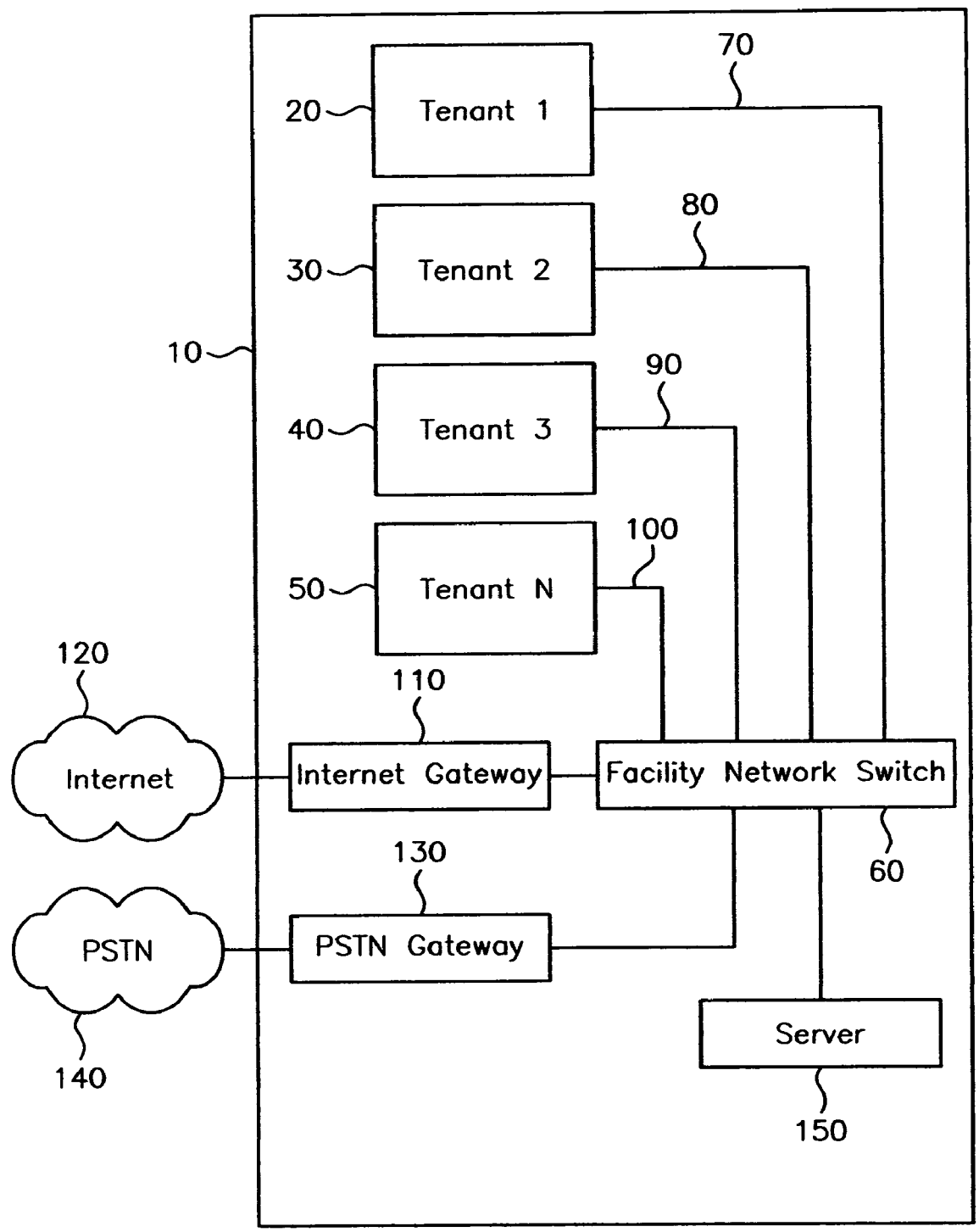
FIG. 1 is a block diagram of a multi-user telephone system constructed in accordance with the present invention.
Figure 2:
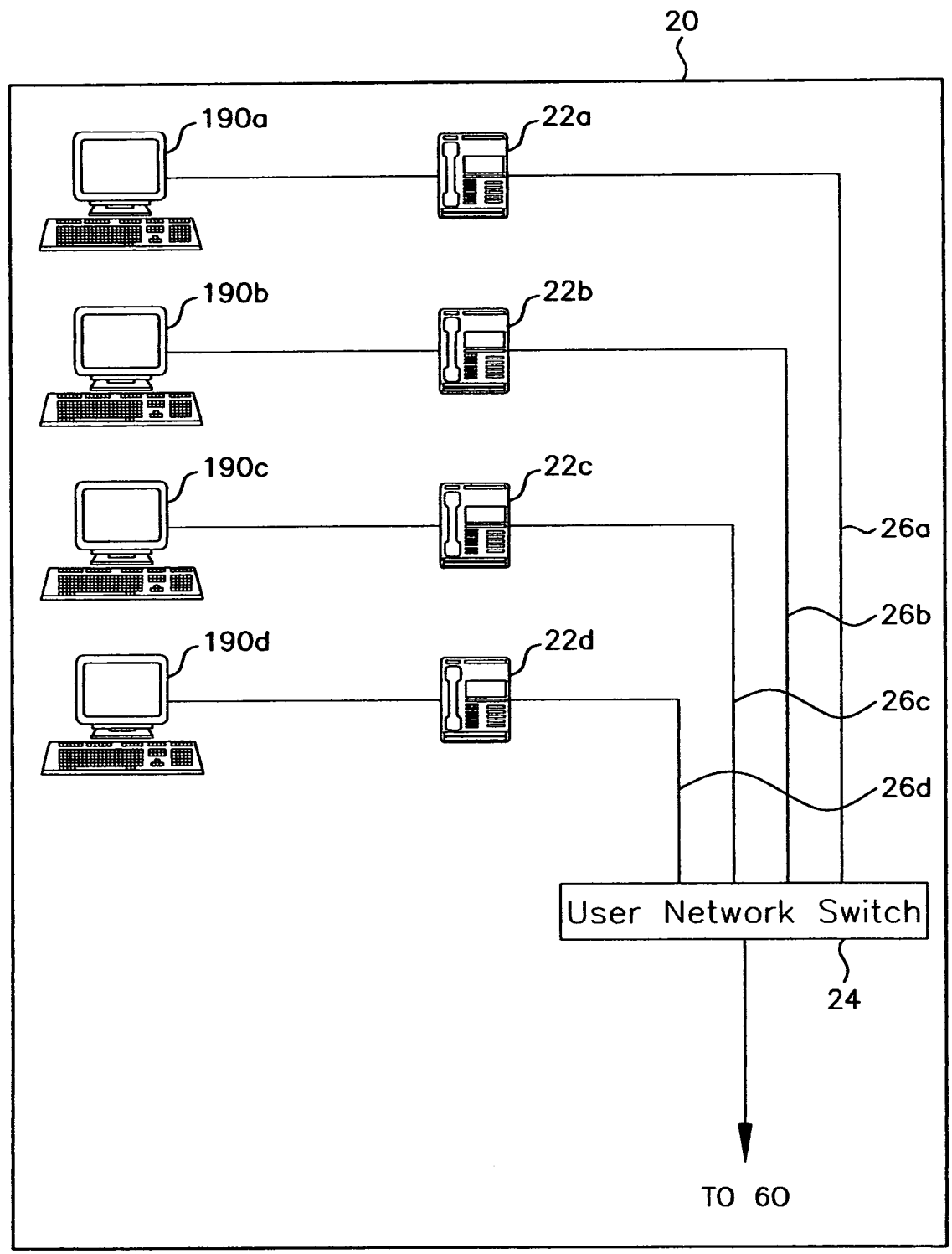
FIG. 2 is a block diagram of the user telephone network portion of a multi-user telephone system constructed in accordance with the present invention.

Referring to FIGS. 1 and 2, a multi-user telephone system 10, constructed in accordance with the present invention, includes a first user telephone network 20, also identified in FIG. 1 as Tenant 1, and a second user telephone network 30, also identified in FIG. 1 as Tenant 2. User telephone networks 20 and 30 are in the same general location, such as an office building. As shown in FIG. 1, a multi-user telephone system, constructed in accordance with the present invention, can have more than two user telephone networks. The multi-user telephone system shown in FIG. 1 has two additional user telephone networks 40 and 50, also identified in FIG. 1 as Tenant 3 and Tenant 4, respectively.

As shown in FIG. 2, each user telephone network includes a plurality of VOIP telephone extensions, identified by reference numerals 22a, 22b, 22c, and 22d. A VOIP telephone extension is one that can develop voice over internet protocol (VOIP) signals. A Polycom IP 500 telephone extension, for example, can serve as a VOIP telephone extension in the present invention. The VOIP telephone extensions of a particular user telephone network have the same telephone number and each has an extension number different from the extension numbers of the other VOIP telephone extensions of the particular user telephone network. The number of VOIP telephone extensions in a user telephone network can be greater than the four telephone extensions shown in FIG. 2.

Each VOIP telephone extension, for example VOIP telephone extension 22a, develops outgoing VOIP signals for transmission via the internet. Such outgoing VOIP signals have audio components digitized from audio frequency signals developed by the VOIP telephone extension and address components corresponding to the addresses of the intended recipients of the outgoing VOIP signals. For the embodiment of the invention being described, the address components are entered by the individual placing the telephone calls as the telephone numbers or extension numbers of the intended recipients of the outgoing VOIP signals, rather than the internet addresses of the intended recipients of the outgoing VOIP signals. As will be made clear below, the telephone numbers or extension numbers of the intended recipients of the outgoing VOIP signals that are entered by the individual placing the telephone calls are replaced by the internet address of the intended recipients of the outgoing VOIP signals, so that the outgoing VOIP signals can be transmitted via the internet. It will be apparent that the present invention can be implemented with the individual placing the telephone calls entering, at the VOIP extension, the internet addresses of the intended recipients of the outgoing VOIP signals as the address component of the outgoing VOIP signals, rather than entering the telephone numbers or extension numbers of the intended recipients of the outgoing VOIP signals.

Each VOIP telephone extension also receives incoming VOIP signals from the internet and converts the received incoming VOIP signals to audio frequency signals that are broadcast by the VOIP telephone extension.

Each user telephone network, for example user telephone network 20, also includes a user network switch, identified in FIG. 2 by reference numeral 24, to which each of the VOIP telephone extensions of the plurality of VOIP telephone extensions 22a, 22b, 22c, and 22d of the user telephone network is connected and through which outgoing VOIP signals, developed by the plurality of VOIP telephone extensions, are conducted. In addition, the incoming VOIP signals received from the internet are conducted to the appropriate VOIP telephone extensions 22a, 22b, 22c, and 22d through user network switch 24. A Dell 3324 network switch, for example, can serve as a user network switch in the present invention. The VOIP telephone extensions are connected to the user network switches, for example, by Category 5E cables that are identified by reference numerals 26a, 26b, 26c, and 26d.

A multi-user telephone system 10, constructed in accordance with the present invention, also includes a facility network switch 60 to which the user network switches, for example user network switch 24, are connected. The outgoing VOIP signals, developed by the VOIP telephone extensions of each of the user telephone networks 20, 30, 40, and 50, are conducted from the user network switch of the respective user telephone network to facility network switch 60. An incoming VOIP signal, received from the internet, is conducted from facility network switch 60 to the user network switch of the respective user telephone network having the VOIP telephone extension having the address of the incoming VOIP signal. A Dell 3324 network switch, for example, can serve as the facility network switch in the present invention. The user network switches of the user telephone networks 20, 30, 40, and 50 are connected to facility network switch 60, for example, by Category 5E cables that are identified by reference numerals 70, 80, 90, and 100, respectively.

A multi-user telephone system 10, constructed in accordance with the present invention, further includes an internet gateway 110 connected to facility network switch 60 and adapted for connection to the internet identified in FIG. 1 by reference numeral 120. The outgoing VOIP signals developed by the VOIP telephone extensions of user telephone networks 20, 30, 40, and 50 are conducted from facility network switch 60 to the internet through internet gateway 110 and the incoming VOIP signals received from the internet are conducted through internet gateway 110 to facility network switch 60. A Cisco 2500 router, for example, can serve as the internet gateway in the present invention.

A multi-user telephone system 10, constructed in accordance with the present invention, preferably includes a public switched telephone network (PSTN) gateway 130 connected to facility network switch 60 and adapted for connection to a public switched telephone network identified in FIG. 1 by reference numeral 140. As will be explained below, each address of the outgoing VOIP signals must be confirmed before it is permitted to pass through internet gateway 110 to the internet. When the address of the outgoing VOIP signal is not confirmed, the outgoing VOIP signal is conducted from facility network switch 60 to a public switched telephone network through PSTN gateway 120. In addition, incoming signals received from a public switched telephone network are conducted through PSTN gateway 130 to facility network switch 60. As a result, the VOIP telephone extensions in user telephone networks 20, 30, 40, and 50 can be the source of signals that are transmitted via the internet or via a public switched telephone network and the recipients of signals received from the internet or from a public switched telephone network. A Sphere UBX CoHub, for example, can serve as the PSTN gateway in the present invention.

A multi-user telephone system 10, constructed in accordance with the present invention, also includes a server 150 for confirming the addresses of the outgoing VOIP signals and controlling facility network switch 60 to conduct a VOIP signal to internet gateway 110 upon confirmation of the address of the outgoing VOIP signal. For an outgoing VOIP signal from any of the VOIP telephone extensions of the user telephone networks 20, 30, 40, and 50 to be conducted to the internet, the address of the outgoing VOIP signal must be recognized by server 150. Accordingly, server 150 is programmed with addresses of possible recipients of the outgoing VOIP signals from the VOIP telephone extensions of the user telephone networks 20, 30, 40, and 50. The addresses of intended recipients of the outgoing VOIP signals are stored in a first database that is accessed prior to an outgoing VOIP signal being conducted by internet gateway 110 to the internet. Server 150 compares the address component of an outgoing VOIP signal with the addresses in the first data base of addresses of intended recipients of the outgoing VOIP signal. Upon confirming the address of the intended recipient of the an outgoing VOIP signal as being an address programmed in server 150, facility network switch 60 is controlled to permit the outgoing VOIP signal to be conducted to internet gateway 110.

Preferably, the address component of an outgoing VOIP signal is the telephone number or extension number of the intended recipient of the outgoing VOIP signal, rather than the internet address of the intended recipient because telephone numbers or extension numbers are easier to use in placing a telephone call than using an internet address. Server 150, however, can be arranged to store either form of address of the intended recipients of the outgoing VOIP signals.

Figure 3:
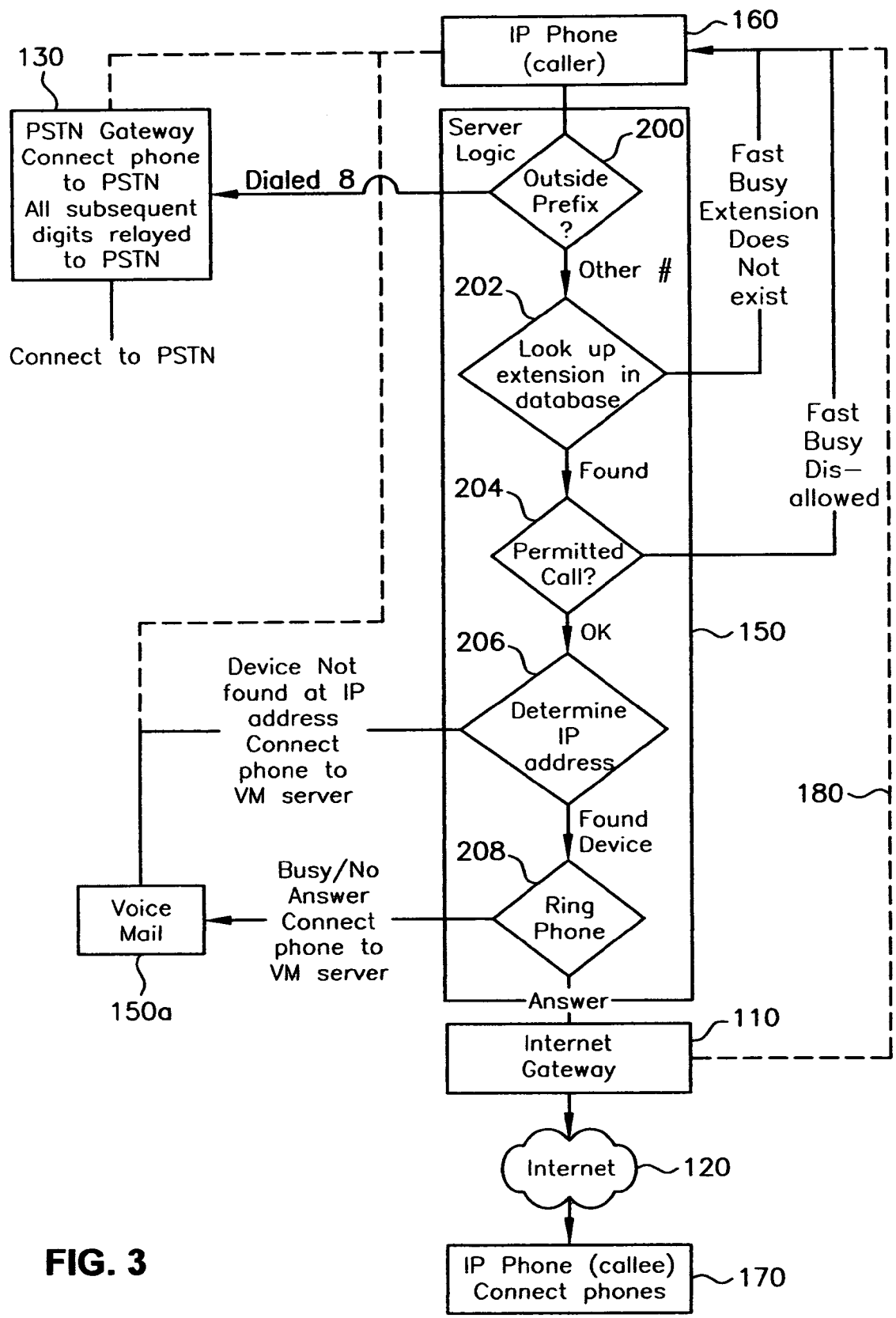
FIG. 3 is a flow chart of the routine performed by the server portion of a multi-user telephone system constructed In accordance with the present invention.

FIG. 3 is a flow chart of a preferred routine, performed by server 150, when either an outgoing VOIP signal from a VOIP telephone extension 160 (identified in FIG. 3 as "caller") is to be conducted to the internet 120 through internet gateway 110 and then transmitted to a remote VOIP telephone extension 170 (identified in FIG. 3 as "callee"), or an outgoing PSTN signal is to be conducted to a public switched telephone network through PSTN gateway 130. In step 200 of the flow chart, the server determines if the outgoing signal is intended for transmission via a public switched telephone network by detecting the presence of a prefix, such as "8", that is introduced at the VOIP telephone extension by the individual placing the call. If such a prefix is detected, the outgoing signal is conducted to the public switched telephone network through PSTN gateway 130.

If the outgoing signal does not have a prefix that indicates that the transmission is to be via a public switched telephone network, the signal is taken as an outgoing VOIP signal intended for transmission via the internet and, in step 202, the address is searched in the first data base of addresses of intended recipients of the outgoing VOIP signal. If the address of the outgoing VOIP signal is not found in this database (i.e., the address of the outgoing VOIP signal is not confirmed), a signal, for example a "fast" busy signal, is conducted through the facility network switch and the appropriate user network switch to that VOIP telephone extension at which the outgoing VOIP signal originated indicating that the outgoing VOIP signal will not be conducted to the Internet.

If the address of the outgoing VOIP signal is found in the first data base of addresses of intended recipients of the outgoing VOIP signal, server 150, in step 204, determines if the signal is to be permitted to be transmitted. Certain telephone systems are designed to limit access to selected extensions and step 204 is included in the routine by which server 150 is operated in such systems. If the outgoing VOIP signal is not permitted to be transmitted, a signal, for example a "fast" busy signal, is conducted to the VOIP telephone extension at which the outgoing VOIP signal originated indicating that the outgoing VOIP signal will not be conducted to the internet.

If the outgoing VOIP signal is permitted to be conducted to the internet and the address component of this signal is the telephone number or extension number of the intended recipient, the telephone number or extension number of the intended recipient is replaced by the internet address of the intended recipient in step 206. If the address component of the outgoing VOIP signal entered originally is the internet address of the intended recipient, step 206 is unnecessary.

Next, In step 208, the callee VOIP telephone extension 170 is rung by the outgoing VOIP signal that is conducted through Internet gateway 110 to the internet. When the callee VOIP telephone extension 170 is answered, the callee VOIP telephone extension 170 and the caller VOIP telephone extension 160 are in direct communication via the internet as represented by dashed line 180.

If the callee VOIP telephone extension 170 is either disconnected or engaged, the caller VOIP telephone extension is connected to a voice mail server 150*a*, which can be included in server 150. In this way, the party originating the telephone call can leave a message for the intended recipient of the telephone call.

Server 150 also confirms the addresses of the intended recipients within multi-user telephone system 10 of incoming VOIP signals from the internet and incoming signals from a public switched telephone network and controls facility network switch 60 to conduct the incoming signals to a user network switch, for example user network switch 24, of one of the user telephone networks 20, 30, 40, and 50 upon confirmation of the address of the intended recipient of an incoming signal. Accordingly, server 150 also is programmed with addresses (e.g., extension numbers) of the VOIP telephone extensions of user telephone networks 20, 30, 40, and 50. The addresses of the VOIP telephone extensions of user telephone networks 20, 30, 40, and 50 are stored in a second database that is accessed prior to an incoming signal being conducted by facility network switch 60 to the appropriate user network switch. Server 150 has means for comparing the address component of an incoming signal with the addresses of the VOIP telephone extensions of user telephone networks 20, 30, 40, and 50 stored in the second data base of server 150. Upon confirming the address of the intended recipient of the an incoming signal as being an address programmed in server 150, facility network switch 60 is controlled to permit the incoming signal to be conducted to the appropriate user network switch, which, in turn, conducts the incoming signal to the appropriate VOIP telephone extension. That portion of server 150 that controls the distribution of incoming signals from the internet or a public switched telephone network can be arranged similar to servers of conventional construction and operation in multi-user telephone systems currently in use.

When a VOIP outgoing signal is developed by callee VOIP telephone extension 170 and transmitted via the internet to multi-user telephone system 10 (i.e., as an incoming VOIP signal to multi-user telephone system 10), server 150 confirms the address of this signal as described above for incoming VOIP signals and outgoing VOIP signals. If the address of this incoming VOIP signal is confirmed as a VOIP telephone extension in one of the networks of multi-user telephone system 10, this incoming VOIP signal is conducted through facility network switch 60 to the appropriate user network switch and further to the appropriate VOIP telephone extension. If the address of this incoming VOIP signal is confirmed as a VOIP telephone extension at another location remote from multi-user telephone system 10, this incoming VOIP signal is conducted through internet gateway 110 for transmission to via the internet to the VOIP telephone extension of the intended recipient. In other words, an incoming VOIP signal intended for a recipient at another location is processed in the same way as described above for outgoing VOIP signals developed by a VOIP extension in one of the user networks of multi-user telephone system 10.

Preferably, server 150 also includes means for maintaining a record of the incoming signals received by multi-user telephone system 10 from the internet and from a public switched telephone network and the outgoing VOIP signals from the VOIP telephone extensions of multi-user telephone system 10. Such means can be, for example a log file in the server in which the outgoing and incoming signals are recorded.

A Dell PowerEdge 1550 server, for example, can serve as the server in the present invention.

As shown in FIG. 2, for the embodiment of the invention being described, a user telephone network also includes one or more computers 160*a*, 160*b*, 160*c*, and 160*d* connected to VOIP telephone extensions 22*a*, 22*b*, 22*c*, and 22*d*, respectively. Computers 190*a*, 190*b*, 190*c*, and 190*d* are sources of data signals that are conducted to the internet or a public switched telephone network by multi-user telephone system 10 in the same way that outgoing signals from the VOIP telephone extensions are conducted to the internet or a public switched telephone network. Computers 190*a*, 190*b*, 190*c*, and 190*d* also are receivers of data signals from the internet or a public switched telephone network that are conducted to the computers by multi-user telephone system 10 in the same way that incoming signals from the internet or a public switched telephone network are conducted to the VOIP telephone extensions.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A multi-user telephone system comprising:
   a first plurality of VOIP telephone extensions all having the same telephone number and each having an extension number different from the extension numbers of the other VOIP telephone extensions of said first plurality of VOIP telephone extensions, each said VOIP telephone extension of said first plurality of VOIP telephone extensions for:
   (a) developing a first outgoing VOIP signal for transmission via the internet and comprising:
      (1) an audio component digitized from audio frequency signals developed by said VOIP telephone extension of said first plurality of VOIP telephone extensions, and
      (2) an address component corresponding to the address of the intended recipient of the first outgoing VOIP signal, and
   (b) converting to audio signals for broadcast by said VOIP telephone extension of said first plurality of VOIP telephone extensions a first incoming VOIP signal received from the internet and having an address corresponding to the address of said VOIP telephone extension of said first plurality of VOIP telephone extension;
   a first user network switch to which each said VOIP telephone extension of said first plurality of VOIP telephone extensions is connected and through which:
   (a) the first outgoing VOIP signal is conducted from said VOIP telephone extension of said first plurality of VOIP telephone extensions, and
   (b) the first incoming VOIP signal received from the internet is conducted to said VOIP telephone extension of said first plurality of VOIP telephone extensions;
   a second plurality of VOIP telephone extensions, in the same general location as said first plurality of VOIP telephone extensions, all having the same telephone number and each having an extension number different from the extension numbers of the other VOIP telephone extensions of said second plurality of VOIP telephone extensions, each said VOIP telephone extension of said second plurality of VOIP telephone extensions for:
   (a) developing a second outgoing VOIP signal for transmission via the internet and comprising:
      (1) an audio component digitized from audio frequency signals developed by said VOIP telephone extension of said second plurality of VOIP telephone extensions, and
      (2) an address component corresponding to the address of the intended recipient of the second outgoing VOIP signal, and
   (b) converting to audio signals for broadcast by said VOIP telephone extension of said second plurality of VOIP telephone extensions a second incoming VOIP signal received from the internet and having an address corresponding to the address of said VOIP telephone extension of said second plurality of VOIP telephone extension;
   a second user network switch to which each said VOIP telephone extension of said second plurality of VOIP telephone extensions is connected and through which:
   (a) the second outgoing VOIP signal is conducted from said VOIP telephone extension of said second plurality of VOIP telephone extensions, and
   (b) the second incoming VOIP signal received from the internet is conducted to said VOIP telephone extension of said second plurality of VOIP telephone extensions;
   a facility network switch to which said first user network switch and said second user network switch are connected and through which:
   (a) the first outgoing VOIP signal is conducted from said first user network switch,
   (b) the first incoming VOIP signal received from the internet is conducted to said first user network switch,
   (c) the second outgoing VOIP signal is conducted from said second user network switch, and
   (d) the second incoming VOIP signal received from the internet is conducted to said second user network switch;
   an internet gateway connected to said facility network switch and adapted for connection to the internet and through which:
   (a) the first outgoing VOIP signal is conducted to the internet,
   (b) the first incoming VOIP signal received from the internet is conducted to said facility network switch,
   (c) the second outgoing VOIP signal is conducted to the internet, and
   (d) the second incoming VOIP signal received from the internet is conducted to said facility network switch; and
   a server for:
   (a) confirming the address of the intended recipient of the first outgoing VOIP signal and controlling said facility switching network to conduct said first VOIP signal to said internet gateway upon confirmation of the address of the intended recipient of the first outgoing VOIP signal,
   (b) confirming the address of the intended recipient of the second outgoing VOIP signal and controlling said facility switching network to conduct said second VOIP signal to said internet gateway upon confirmation of the address of the intended recipient of the second outgoing VOIP signal,
   (c) confirming the address of the first incoming VOIP signal received from the internet as being the address of said VOIP telephone extension of said first plurality of VOIP telephone extensions and directing the first incoming VOIP signal to said VOIP telephone extension of said first plurality of VOIP telephone extensions, and
   (d) confirming the address of the second incoming VOIP signal received from the internet as being the address of said VOIP telephone extension of said second plurality of VOIP telephone extensions and directing the second incoming VOIP signal to said VOIP telephone extension of said second plurality of VOIP telephone extensions.

2. A multi-user telephone system according to claim 1 wherein:
   (a) the address component of the first outgoing VOIP signal is one of (i) the telephone number of the intended recipient of the first outgoing VOIP signal, and (ii) the extension number of the intended recipient of the first outgoing VOIP signal,
(b) the address component of the second outgoing VOIP signal is one of (i) the telephone number of the intended recipient of the second outgoing VOIP signal, and (ii) the extension number of the intended recipient of the second outgoing VOIP signal, and
(c) said server includes means for replacing the address component of the first outgoing VOIP signal and the address component of the second outgoing VOIP signal with, respectively, the internet address of the intended recipient of the first outgoing VOIP signal and the internet address of the intended recipient of the second outgoing VOIP signal.

3. A multi-user telephone system according to claim 1 wherein said server includes:
(a) a first data base of:
  (1) addresses of intended recipients of the first outgoing VOIP signal, and
  (2) addresses of intended recipients of the second outgoing VOIP signal,
(b) a second data base of:
  (1) addresses of said VOIP telephone extensions of said first plurality of VOIP telephone extensions, and
  (2) addresses of said VOIP telephone extensions of said second plurality of VOIP telephone extensions,
(c) means for accessing said first data base of addresses prior to:
  (1) the first outgoing VOIP signal being conducted by said internet gateway to the internet, and
  (2) the second outgoing VOIP signal being conducted by said internet gateway to the internet,
(d) means for accessing said second data base of addresses prior to
  (1) the first incoming VOIP signal being conducted to said facility network switch, and
  (2) the second incoming VOIP signal being conducted to said facility network switch,
(e) means for comparing:
  (1) the address component of the first outgoing VOIP signal with the addresses in said first data base of addresses of intended recipients of the first outgoing VOIP signal,
  (2) the address component of the second outgoing VOIP signal with the addresses in said first data base of addresses of intended recipients of the second outgoing VOIP signal,
  (3) the address of the first incoming VOIP signal with the addresses in said second data base of addresses of said VOIP telephone extensions of said first plurality of VOIP telephone extensions, and
  (4) the address of the second incoming VOIP signal with the addresses in said second data base of addresses of said VOIP telephone extensions of said second plurality of VOIP telephone extensions, and
(f) means for controlling said facility network switch to conduct:
  (1) the first outgoing VOIP signal to said internet gateway when the address component of the first outgoing VOIP signal is the same as an address in said first data base of addresses of intended recipients of the first outgoing VOIP,
  (2) the second outgoing VOIP signal said internet gateway when the address component of the second outgoing VOIP signal is the same as an address in said first data base of addresses of intended recipients of the second outgoing VOIP signal,
  (3) the first incoming VOIP signal to said first user network switch when the address component of the first incoming VOIP signal is the same as the address in said second data base of said VOIP telephone extension of said first plurality of VOIP telephone extensions, and
  (4) the second incoming VOIP signal to said second user network switch when the address component of the second incoming VOIP signal is the same as the address in said second data base of said VOIP telephone extension of said second plurality of VOIP telephone extensions.

4. A multi-user telephone system according to claim 3 wherein:
(a) said VOIP telephone extension of said first plurality of VOIP telephone extensions and said VOIP telephone extension of said second plurality of VOIP telephone extensions also develop outgoing PSTN signals for transmission via a public switched telephone network,
(b) said multi-user telephone system further includes a public switched telephone network gateway, connected to said facility network switch and adapted for connection to a public switched telephone network, through which:
  (1) the outgoing PSTN signals are conducted from said facility network switch to said public switched telephone network,
  (2) incoming PSTN signals from said public switched telephone network are conducted to said facility network switch,
(c) said server also includes:
  (1) means for detecting the outgoing PSTN signals,
  (2) means for controlling said facility network switch to conduct:
    (i) an outgoing PSTN signal from said facility network switch to said public switched telephone network gateway when the outgoing PSTN signal is detected, and
    (ii) an incoming PSTN signal from said public switched telephone network gateway to said facility network switch.

5. A multi-user telephone system according to claim 1 further including:
(a) at least one source of data signals connected to one of said VOIP telephone extensions, and
(b) at least one receiver of data signals connected to one of said VOIP telephone extensions.

6. A multi-user telephone system according to claim 4 wherein said server also includes means for maintaining a record of:
(a) the first incoming VOIP signal received from the internet,
(b) the second incoming VOIP signal received from the internet,
(c) the first outgoing VOIP signal from said VOIP telephone extension of said first plurality of VOIP telephone extensions and
(d) the second outgoing VOIP signal from said VOIP telephone extension of said second plurality of VOIP telephone extensions.

7. A multi-user telephone system according to claim 4:
(a) wherein said server further includes means for developing an indication that an outgoing VOIP signal will not be conducted to the internet when the address of that outgoing VOIP signal is not confirmed by said server, and (b) said multi-user telephone system further includes means for conducting the indication to that VOIP telephone extension which developed the outgoing VOIP signal not being conducted to the internet.

8. A multi-user telephone system comprising:

a first user telephone network including:

(a) a first plurality of VOIP telephone extensions all having the same telephone number and each having an extension number different from the extension numbers of the other VOIP telephone extensions of said first plurality of VOIP telephone extensions, each said VOIP telephone extension of said first plurality of VOIP telephone extensions for:
  (1) developing a first outgoing VOIP signal for transmission via the internet and comprising:
    (i) an audio component digitized from audio frequency signals developed by said VOIP telephone extension of said first plurality of VOIP telephone extensions, and
    (ii) an address component corresponding to the address of the intended recipient of the first outgoing VOIP signal, and
  (2) converting to audio signals for broadcast by said VOIP telephone extension of said first plurality of VOIP telephone extensions a first incoming VOIP signal received from the internet and having an address corresponding to the address of said VOIP telephone extension of said first plurality of VOIP telephone extension, and (b) a first user network switch to which each said VOIP telephone extension of said first plurality of VOIP telephone extensions is connected and through which:
  (1) the first outgoing VOIP signal is conducted, and
  (2) the first incoming VOIP signal is conducted to said VOIP telephone extension of said first plurality of VOIP telephone extensions;

a second user telephone network including:

(a) a second plurality of VOIP telephone extensions all having the same telephone number and each having an extension number different from the extension numbers of the other VOIP telephone extensions of said second plurality of VOIP telephone extensions, each said VOIP telephone extension of said second plurality of VOIP telephone extensions for:
  (1) developing a second outgoing VOIP signal for transmission via the internet and comprising:
    (i) an audio component digitized from audio frequency signals developed by said VOIP telephone extension of said second plurality of VOIP telephone extensions, and
    (ii) an address component corresponding to the address of the intended recipient of the second outgoing VOIP signal, and
  (2) converting to audio signals for broadcast by said VOIP telephone extension of said second plurality of VOIP telephone extensions a second incoming VOIP signal received from the internet and having an address corresponding to the address of said VOIP telephone extension of said second plurality of VOIP telephone extensions, and (b) a second user network switch to which each said VOIP telephone extension of said second plurality of VOIP telephone extensions is connected and through which:
  (1) the second outgoing VOIP signal is conducted, and
  (2) the second incoming VOIP signal received from the internet is conducted to said VOIP telephone extension of said second plurality of VOIP telephone extensions;

a facility network switch to which said first user network switch and said second user network switch are connected and through which:
  (a) the first outgoing VOIP is conducted from said first user network switch,
  (b) the first incoming VOIP signal received from the internet is conducted to said first user network switch,
  (c) the second outgoing VOIP signal is conducted from said second user network switch, and
  (d) the second incoming VOIP signal received from the internet is conducted to said second user network switch;

an internet gateway connected to said facility network switch and adapted for connection to the internet and through which:
  (a) the first outgoing VOIP signal is conducted to the internet,
  (b) the first incoming VOIP signal received from the internet is conducted to said facility network switch,
  (c) the second outgoing VOIP signal is conducted to the internet, and
  (d) the second incoming VOIP signal received from the internet is conducted to said facility network switch; and a server programmed with:
  (a) addresses of intended recipients of the first outgoing VOIP signal and addresses of intended recipients of the second outgoing VOIP signal, and
  (b) addresses of said VOIP telephone extensions of said first plurality of VOIP telephone extensions and addresses of said VOIP telephone extensions of said second plurality of VOIP telephone extensions, for:
  (a) confirming the address of the intended recipient of the first outgoing VOIP signal as being an address programmed in said server,
  (b) controlling said facility switching network to conduct said first outgoing VOIP signal to said internet gateway upon confirming the address of the intended recipient of the first outgoing VOIP signal as being an address programmed in said server,
  (c) confirming the address of the intended recipient of the second outgoing VOIP signal as being an address programmed in said server,
  (d) controlling said facility switching network to conduct said second outgoing VOIP signal to said internet gateway upon confirming the address of the intended recipient of the second outgoing VOIP signal as being an address programmed in said server,
  (e) confirming the address of the first incoming VOIP signal as being an address programmed in said server,
  (f) controlling said facility switching network to conduct the first incoming VOIP signal to said VOIP telephone extension of said first plurality of VOIP telephone extensions upon confirming the address of the first incoming VOIP signal as being an address programmed in said server,
  (g) confirming the address of the second incoming VOIP signal as being an address programmed in said server, and
  (h) controlling said facility switching network to conduct said second incoming VOIP signal to said VOIP telephone extension of said second plurality of VOIP telephone extensions upon confirming the address of the second incoming VOIP signal as being an address programmed in said server.

9. A multi-user telephone system according to claim 8 wherein said server includes:
(a) means for comparing:
(1) the address component of the first outgoing VOIP signal with the addresses programmed in said server of intended recipients of the first outgoing VOIP signal,
(2) the address component of the second outgoing VOIP signal with the addresses programmed in said server of intended recipients of the second outgoing VOIP signal,
(3) the address of the first incoming VOIP signal received from the internet with the addresses programmed in said server of said VOIP telephone extensions of said first plurality of VOIP telephone extensions, and
(4) the address of the second incoming VOIP signal received from the internet with the addresses programmed in said server of said VOIP telephone extensions of said second plurality of VOIP telephone extensions, and
(b) means for permitting:
(1) the first outgoing VOIP signal to be conducted to the internet when the address component of the first outgoing VOIP signal is the same as an address programmed in said server of intended recipients of the first outgoing VOIP signal,
(2) the second outgoing VOIP signal to be conducted to the internet when the address component of the second outgoing VOIP signal is the same as an address programmed in said server of intended recipients of the second outgoing VOIP signal,
(3) the first incoming VOIP signal received from the internet to be conducted to said facility switching network when the address component of the first incoming VOIP signal is the same as an address programmed in said server of the addresses of said VOIP telephone extensions of said first plurality of VOIP telephone extensions, and
(4) the second incoming VOIP signal received from the internet to be conducted to said facility switching network when the address component of the second incoming VOIP signal is the same as an address programmed in said server of the addresses of said VOIP telephone extensions of said second plurality of VOIP telephone extensions.

10. A multi-user telephone system according to claim 9 wherein:
(a) said VOIP telephone extension of said first plurality of VOIP telephone extensions and said VOIP telephone extension of said second plurality of VOIP telephone extensions also develop outgoing PSTN signals for transmission via a public switched telephone network,
(b) said multi-user telephone system further includes a public switched telephone network gateway, connected to said facility network switch and adapted for connection to a public switched telephone network, through which:
(1) the outgoing PSTN signals are conducted from said facility network switch to said public switched telephone network,
(2) incoming PSTN signals from said public switched telephone network are conducted to said facility network switch,
(c) said server also includes:
(1) means for detecting the outgoing PSTN signals,
(2) means for controlling said facility network switch to conduct:
(i) an outgoing PSTN signal from said facility network switch to said public switched telephone network gateway when the outgoing PSTN signal is detected, and
(ii) an incoming PSTN signal from said public switched telephone network gateway to said facility network switch.

11. A multi-user telephone system according to claim 10 wherein said server also includes means for maintaining a record of all incoming VOIP signals, all incoming PSTN signals, all outgoing VOIP signals, and all outgoing PSTN signals.

12. A multi-user telephone system according to claim 11 further including:
(a) at least one source of data signals connected to one of said VOIP telephone extensions, and
(b) at least one receiver of data signals connected to one of said VOIP telephone extensions.

13. A multi-user telephone system according to claim 8 wherein at least one of said first user telephone network and said second user telephone network further includes:
(a) at least one source of data signals connected to one of said VOIP telephone extensions, and
(b) at least one receiver of data signals connected to one of said VOIP telephone extensions.

14. A multi-user telephone system according to claim 13:
(a) wherein said server further includes means for developing an indication that an outgoing VOIP signal will not be conducted to the internet when the address of that outgoing VOIP signal is not confirmed by said server, and
(b) said multi-user telephone system further includes means for conducting the indication to that VOIP telephone extension which developed the outgoing VOIP signal not being conducted to the internet.

15. A multi-user telephone system comprising:
a plurality of user telephone networks, all in the same general location, and each having:
(a) a plurality of VOIP telephone extensions with all said VOIP telephone extensions in the same user telephone network having the same telephone number and each said VOIP telephone extension in the same user telephone network having an extension number different from the extension numbers of the other VOIP telephone extensions of same user telephone network, each said VOIP telephone extension for:
(1) developing outgoing VOIP signals for transmission via the internet with each of the outgoing VOIP signals having an audio component digitized from audio frequency signals developed by said VOIP telephone extension and an address component corresponding to the address of the intended recipient of the outgoing VOIP signal, and
(2) converting incoming VOIP signals received from the internet to audio signals that are broadcast by said VOIP telephone extensions;
(b) a user network switch to which each said VOIP telephone extension of the same user telephone network is connected and through which:
(1) the outgoing VOIP signals are conducted from said VOIP telephone extensions, and
(2) the incoming VOIP signals received from the internet are conducted to said VOIP telephone extensions;

a facility network switch to which each said user network switch is connected and through which the outgoing VOIP signals are conducted from the user network switches and the incoming VOIP signals received from the internet are conducted to the user network switches;

an internet gateway connected to said facility network switch and adapted for connection to the internet for conducting (i) the outgoing VOIP signals from said facility network switch to the internet, and (ii) the incoming VOIP signals received from the internet to said facility network switch; and a server programmed with addresses of intended recipients of the outgoing VOIP signals and the addresses of the VOIP telephone extensions in said user telephone networks for:
   (a) confirming the addresses of the intended recipients of the outgoing VOIP signals as being addresses programmed in said server,
   (b) controlling said facility network switch to conduct the outgoing VOIP signals to said internet gateway upon confirming the addresses of the intended recipients of the outgoing VOIP signals as being addresses programmed in the server,
   (c) confirming the addresses of the incoming VOIP signals as being addresses programmed in said server, and
   (d) controlling said facility network switch to conduct the incoming VOIP signals to said user network switches for passage to said VOIP telephone extensions upon confirming the addresses of the incoming VOIP signals as being addresses programmed in the server.

16. A multi-user telephone system according to claim 15 wherein said server includes:
   (a) a first data base of addresses of intended recipients of the outgoing VOIP signals,
   (b) a second data base of addresses of said VOIP telephone extensions,
   (c) means for accessing said first data base of addresses prior to an outgoing VOIP signal being conducted by said internet gateway to the internet,
   (d) means for accessing said second data base of addresses prior to an incoming VOIP signal being conducted to said facility switching network,
   (e) means for comparing:
      (1) the address components of the outgoing VOIP signals with the addresses in said first data base of addresses of intended recipients of the outgoing VOIP signals,
      (2) the address components of the incoming VOIP signals with the addresses in said second data base of addresses of said VOIP telephone extensions, and
   (f) means for controlling said facility network switch to conduct:
      (1) the outgoing VOIP signals to said internet gateway when the address components of the outgoing VOIP signals are the same as an address in said first data base of addresses of intended recipients of the outgoing VOIP signals, and
      (2) the incoming VOIP signals to said user network switches when the address components of the incoming VOIP signals are the same as an address in said second data base of addresses of said VOIP telephone extensions.

17. A multi-user telephone system according to claim 16 wherein:
   (a) said VOIP telephone extensions also develop outgoing PSTN signals for transmission via a public switched telephone network,
   (b) said multi-user telephone system further includes a public switched telephone network gateway, connected to said facility network switch and adapted for connection to a public switched telephone network, through which:
      (1) the outgoing PSTN signals are conducted from said facility network switch to said public switched telephone network,
      (2) incoming PSTN signals from said public switched telephone network are conducted to said facility network switch,
   (c) said server also includes:
      (1) means for detecting the outgoing PSTN signals,
      (2) means for controlling said facility network switch to conduct:
         (i) outgoing PSTN signals from said facility network switch to said public switched telephone network gateway when the outgoing PSTN signals are detected, and
         (ii) incoming PSTN signals from said public switched telephone network gateway to said facility network switch.

18. A multi-user telephone system according to claim 17 wherein said server also includes means for maintaining a record of all incoming VOIP signals, all incoming PSTN signals, all outgoing VOIP signals, and all outgoing PSTN signals.

19. A multi-user telephone system according to claim 18 further including:
   (a) at least one source of data signals connected to one of said VOIP telephone extensions, and
   (b) at least one receiver of data signals connected to one of said VOIP telephone extensions.

20. A multi-user telephone system according to claim 18:
   (a) wherein said server further includes means for developing an indication that an outgoing VOIP signal will not be conducted to the internet when the address of that outgoing VOIP signal is not confirmed by said server, and
   (b) said multi-user telephone system further includes means for conducting the indication to that VOIP telephone extension which developed the outgoing VOIP signal not being conducted to the internet.

* * * * *

UNITED STATES PATENT AND TRADEMARK OFFICE
CERTIFICATE OF CORRECTION

PATENT NO. : 7,474,746 B2  Page 1 of 1
APPLICATION NO. : 10/822127
DATED : January 6, 2009
INVENTOR(S) : Judah S. Berkowitz and Edward J. Sager It is certified that error appears in the above-identified patent and that said Letters Patent is hereby corrected as shown below:

In column 8, line 42, "switching network" should read -- network switch --.
In column 8, line 48, "switching network" should read -- network switch --.
In column 12, line 41, "switching network" should read -- network switch --.
In column 12, line 56, "switching network" should read -- network switch --.
In column 12, line 65, "switching network" should read -- network switch --.
In column 13, line 37 and 38, "switching network" should read -- network switch --.
In column 13, line 44 and 45, "switching network" should read -- network switch --.
In column 15, line 42, "switching network" should read -- network switch --.

Signed and Sealed this

Eleventh Day of May, 2010

David J. Kappos
*Director of the United States Patent and Trademark Office*